United States Patent
Ebner

(10) Patent No.: US 10,329,798 B2
(45) Date of Patent: *Jun. 25, 2019

(54) METHOD FOR MONITORING LOCKOUT PROCEDURES

(71) Applicant: Master Lock Company LLC, Oak Creek, WI (US)

(72) Inventor: Timothy Ebner, Menomonee Falls, WI (US)

(73) Assignee: Master Lock Company LLC, Oak Creek, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/896,179

(22) Filed: Feb. 14, 2018

(65) Prior Publication Data

US 2018/0171663 A1    Jun. 21, 2018

Related U.S. Application Data

(63) Continuation of application No. 15/461,965, filed on Mar. 17, 2017, now Pat. No. 9,920,550, which is a
(Continued)

(51) Int. Cl.
*H04Q 5/22* (2006.01)
*E05B 39/04* (2006.01)
(Continued)

(52) U.S. Cl.
CPC ............. *E05B 39/04* (2013.01); *E05B 67/00* (2013.01); *E05B 67/383* (2013.01); *F16P 3/08* (2013.01);
(Continued)

(58) Field of Classification Search
CPC ........ E05B 39/04; E05B 67/00; E05B 67/383; E05B 2047/0058; E05B 2047/0067;
(Continued)

(56) References Cited

U.S. PATENT DOCUMENTS 4,199,060 A    4/1980  Howard
4,766,746 A *  8/1988  Henderson .............. G07C 1/32
                                                    340/5.65
(Continued)

FOREIGN PATENT DOCUMENTS

CN    101014749 A     8/2007
WO    2005118987 A1   12/2005
(Continued)

OTHER PUBLICATIONS

Search Report and Written Opinion from International Application No. PCT/US2011/059935, dated Feb. 29, 2012.
(Continued)

*Primary Examiner* — Zhen Y Wu
(74) *Attorney, Agent, or Firm* — Calfee, Halter & Griswold LLP

(57) ABSTRACT

In a method of monitoring lockout procedures, a first lockout device is secured with a first component in a lockout condition to block operation of the first component, and a corresponding first data signal is received, with the first data signal including at least a first identification code corresponding to the first lockout device. A second lockout device is secured with a second component in a lockout condition to block operation of the second component, and a corresponding second data signal is received, with the second data signal including at least a second identification code corresponding to the second lockout device. The first and second data signals are monitored to determine an order in which the first and second lockout devices have been locked out, which is compared with a predefined lockout procedure. An alert is provided if the order is inconsistent with the predefined lockout procedure.

16 Claims, 3 Drawing Sheets

Related U.S. Application Data continuation of application No. 13/884,282, filed as application No. PCT/US2011/059935 on Nov. 9, 2011, now Pat. No. 9,600,696.

(60) Provisional application No. 61/411,591, filed on Nov. 9, 2010.

(51) Int. Cl.

| | |
|---|---|
| *G07C 9/00* | (2006.01) |
| *G06K 7/10* | (2006.01) |
| *F16P 3/08* | (2006.01) |
| *H04W 4/80* | (2018.01) |
| *E05B 67/00* | (2006.01) |
| *E05B 67/38* | (2006.01) |
| *E05B 47/00* | (2006.01) |

(52) U.S. Cl.
CPC ............ *G06K 7/10* (2013.01); *G06K 7/10366* (2013.01); *G07C 9/00111* (2013.01); *G07C 9/00182* (2013.01); *G07C 9/00571* (2013.01); *H04W 4/80* (2018.02); *E05B 2047/0058* (2013.01); *E05B 2047/0067* (2013.01); *G07C 2009/00793* (2013.01)

(58) Field of Classification Search
CPC ... H04W 4/80; F16P 3/08; G06K 7/10; G06K 7/10366; G07C 9/00111; G07C 9/00182; G07C 9/00571; G07C 2009/00793
USPC ........................................................ 340/1.01
See application file for complete search history.

(56) References Cited

U.S. PATENT DOCUMENTS

| | | | |
|---|---|---|---|
| 5,399,844 A | 3/1995 | Holland | |
| 5,438,312 A | 8/1995 | Lewis | |
| 5,799,062 A * | 8/1998 | Lazzara | H04M 11/04 379/184 |
| 5,870,382 A * | 2/1999 | Tounai | H04L 12/5601 340/2.8 |
| 6,227,019 B1 | 5/2001 | Chhatwal | |
| 6,441,735 B1 | 8/2002 | Marko et al. | |
| 6,629,047 B1 * | 9/2003 | Guliani | G11C 5/147 702/108 |
| 7,236,085 B1 | 6/2007 | Aronson et al. | |
| 7,239,229 B2 | 7/2007 | Bauhahn | |
| 7,298,251 B2 | 11/2007 | Meyers | |
| 7,380,721 B2 | 6/2008 | Zhang | |
| 7,497,705 B2 | 3/2009 | Larson et al. | |
| 7,501,593 B2 | 3/2009 | Brojanac | |
| 7,581,420 B2 | 9/2009 | Manthe et al. | |
| 7,636,031 B2 | 12/2009 | Mirmobin | |
| 7,752,876 B2 | 7/2010 | Meekma et al. | |
| 8,232,860 B2 | 7/2012 | Goel | |
| 8,294,580 B2 | 10/2012 | Witwer et al. | |
| 9,600,696 B2 | 3/2017 | Ebner | |
| 2004/0046642 A1 | 3/2004 | Becker et al. | |
| 2005/0098621 A1 | 5/2005 | de Sylva | |
| 2006/0151306 A1 * | 7/2006 | Lau | H01H 9/282 200/43.14 |
| 2006/0290473 A1 | 12/2006 | Mahasenan et al. | |
| 2007/0290789 A1 | 12/2007 | Segev et al. | |
| 2008/0150686 A1 | 6/2008 | Mackjust | |
| 2008/0186145 A1 | 8/2008 | Manley et al. | |
| 2008/0252415 A1 | 10/2008 | Larson | |
| 2008/0264116 A1 | 10/2008 | McNeil | |
| 2009/0090148 A1 | 4/2009 | Kollin et al. | |
| 2010/0013599 A1 | 1/2010 | Tartock et al. | |
| 2010/0228428 A1 * | 9/2010 | Harshbarger | G07C 5/008 701/31.4 |
| 2010/0253519 A1 | 10/2010 | Brackmann et al. | |
| 2010/0269553 A1 | 10/2010 | Zhong | |
| 2010/0326145 A1 | 12/2010 | Powers et al. | |
| 2010/0326146 A1 | 12/2010 | Powers et al. | |
| 2012/0007736 A1 | 1/2012 | Worthington | |
| 2012/0081214 A1 | 4/2012 | Alan | |
| 2013/0147626 A1 | 6/2013 | Hammond | |
| 2018/0171663 A1 * | 6/2018 | Ebner | G07C 9/00571 |

FOREIGN PATENT DOCUMENTS

| | | |
|---|---|---|
| WO | 2008037645 A2 | 4/2008 |
| WO | 2008037656 A2 | 4/2008 |

OTHER PUBLICATIONS

International Preliminary Report on Patentability from International Application No. PCT/US2011/059935, dated Oct. 2, 2013.
First Office Action for Mexican Patent Application No. MX/a/2013/005206 dated Mar. 20, 2014.
European Search Report for European Patent Application No. 11838251.3 dated Oct. 2, 2014.
Office Action for Chinese Patent Application No. 201180053774.5 dated Feb. 16, 2015.
Office Action for Canadian Patent Application No. 2,816,140 dated Dec. 19, 2014.
Second Office Action for Mexican Patent Application No. MX/a/2013/005206 dated Sep. 18, 2014.
Office Action for Canadian Patent Application No. 2,816,140 dated Oct. 6, 2015.
Office Action for Canadian Patent Application No. 2,816,140 dated Sep. 8, 2016.

* cited by examiner

METHOD FOR MONITORING LOCKOUT PROCEDURES

CROSS-REFERENCE TO RELATED APPLICATION

The present application is a continuation of U.S. patent application Ser. No. 15/461,965, filed Mar. 17, 2017, entitled "ELECTRONICALLY MONITORED SAFETY LOCKOUT DEVICES, SYSTEMS AND METHODS", which is a continuation of U.S. patent application Ser. No. 13/884,282, filed Oct. 17, 2013, entitled "ELECTRONICALLY MONITORED SAFETY LOCKOUT DEVICES, SYSTEMS AND METHODS", now U.S. Pat. No. 9,600,696, issued on Mar. 21, 2017, which is a national phase entry under 35 U.S.C. § 371 of, and claims priority to, International Application No. PCT/US2011/059935 filed on Nov. 9, 2011, entitled "ELECTRONICALLY MONITORED SAFETY LOCKOUT DEVICES, SYSTEMS AND METHODS", which claims benefit of U.S. Provisional Application No. 61/411,591, filed Nov. 9, 2010, entitled "ELECTRONICALLY MONITORED SAFETY LOCKOUT DEVICES, SYSTEMS AND METHODS," the entire disclosures of which are fully incorporated herein by reference.

BACKGROUND

Security devices, such as padlocks and other types of conventional locks, are known in the art. Many security devices are provided for restricting access to equipment and control instruments, including, for example, electrical components, such as switches, dials and push buttons, and fluid system components, such as valves and pressure regulators. Industrial and commercial equipment are often provided with a lockout feature (e.g., a locking bracket or similar structure) to facilitate the restriction of access to, or lockout of, the equipment. The equipment's lockout feature typically includes a hasp or other such apertured member or members configured to receive a shackle (or cable or other retaining member) of one or more locks to prevent movement of the apertured member with respect to another portion of the lockout feature, thereby preventing access to, or operation of, the equipment.

SUMMARY

The present application describes safety lockout devices, systems, and methods for electronically monitoring safety lockout procedures.

Accordingly, in one exemplary embodiment of the present application, a method of monitoring lockout procedures is contemplated. In an exemplary method, a first lockout device is secured with a first component in a lockout condition to block operation of the first component, and a corresponding first data signal is received, with the first data signal including at least a first identification code corresponding to the first lockout device. A second lockout device is secured with a second component in a lockout condition to block operation of the second component, and a corresponding second data signal is received, with the second data signal including at least a second identification code corresponding to the second lockout device. The first and second data signals are monitored to determine an order in which the first and second lockout devices have been locked out, which is compared with a predefined lockout procedure. An alert is provided if the order is inconsistent with the predefined lockout procedure.

According to another exemplary embodiment, a system for monitoring a lockout condition of a component includes a lockout device, a lock unit, and a reader. The lockout device is moveable between a lockout condition blocking operation of the component and an access condition permitting operation of the component. The lock unit is configured to be secured to a lockout interface of the lockout device to secure the lockout device in the lockout condition. One of the lockout device and the lock unit includes a communication module configured to communicate a data signal including an identification code identifying the one of the lockout device and the lock unit. The reader is remote from the one of the lockout device and the lock unit, and is configured to receive the data signal at least when the lockout device is assembled with the component and the lock unit is secured to the lockout interface of the lockout device.

According to another exemplary aspect of the present application, a method of monitoring lockout procedures for a multi-process arrangement having first and second components is contemplated. In one exemplary method, a first lockout device is secured with the first component in a lockout condition to block operation of the first component. A first data signal is generated as a result of the first lockout device being secured with the first component in the lockout condition, the first data signal including at least a first identification code corresponding to the first lockout device. A second lockout device is secured with the second component in a lockout condition to block operation of the second component. A second data signal is generated as a result of the second lockout device being secured with the second component in the lockout condition, the second data signal including at least a second identification code corresponding to the second lockout device. The first and second data signals are monitored to determine an order in which the first and second lockout devices have been locked out. The order in which the first and second lockout devices have been locked out is compared with a predefined lockout procedure, and an alert is provided if the order is inconsistent with the predefined lockout procedure.

In another exemplary embodiment, a system is provided for monitoring lockout procedures for a multi-process arrangement having first and second components. The system includes first and second lockout devices, first and second communication modules, at least one receiver, and a central computer. The first lockout device is configured to be secured with the first component in a lockout condition to block operation of the first component. The first communication module is configured to generate a first data signal as a result of the first lockout device being secured with the first component in the lockout condition, with the first data signal including at least a first identification code corresponding to the first lockout device. The second lockout device is configured to be secured with the second component in a lockout condition to block operation of the second component. The second communication module is configured to generate a second data signal as a result of the second lockout device being secured with the second component in the lockout condition, with the second data signal including at least a second identification code corresponding to the second lockout device. The at least one receiver is configured to receive the first and second data signals from the first and second communication modules. The central computer is configured to receive information corresponding to the first and second data signals from the at least one receiver, and to compare the information to a predefined lockout procedure.

BRIEF DESCRIPTION OF THE DRAWINGS

Further features and advantages will become apparent from the following detailed description made with reference to the accompanying drawings, wherein.

DETAILED DESCRIPTION

Figure 1:
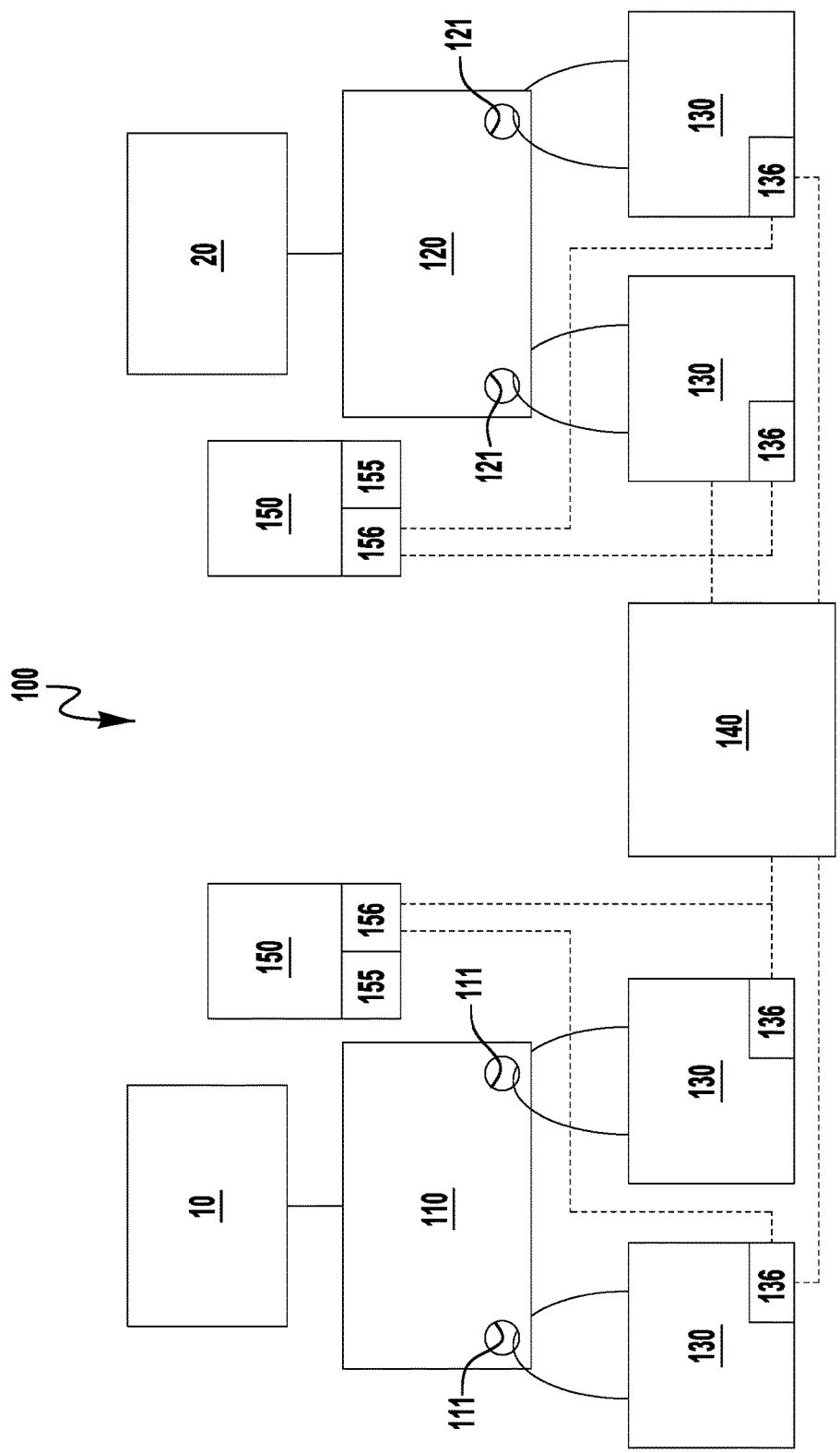
FIG. 1 is a schematic representation of an electronically monitored safety lockout system, according to an exemplary embodiment.

The Detailed Description merely describes exemplary embodiments of the invention and is not intended to limit the scope of the claims in any way. Indeed, the invention is broader than and unlimited by the exemplary embodiments, and the terms used in the claims have their full ordinary meaning.

Also, while the exemplary embodiments described in the specification and illustrated in the drawings relate to padlocks and lockout devices used with padlocks in safety lockout systems, it should be understood that many of the inventive features described herein may be applied to other locking devices, arrangements, and systems, including, for example, equipment having integral lockout features (e.g., instrument-blocking lockout apertures), lockout devices with integral locking mechanisms, lock out stations, tag out stations, other padlock applications, door locks, cabinet locks, cargo locks, lock boxes, key safes, automotive locks, cycle locks, and trailer locks.

The present application contemplates safety lockout devices and systems configured to provide an electronic record or audit trail including information regarding a specific safety lockout operation involving one or more pieces of equipment and/or control instruments. For example, a safety lockout system may be configured to collect information pertaining to the time and date that a lockout is initiated, the duration of the lockout, any interruptions in the lockout, identification of the individual or individuals conducting (e.g., initiating or terminating) the lockout, and the sequence in which multiple control instruments or pieces of equipment are locked out or returned to service. This information may be recorded as proof that a lockout procedure was properly conducted, or to provide a warning that a system has been improperly locked out or returned to service.

According to an inventive aspect of the present application, as schematically shown in FIG. 1, a safety lockout system 100 includes one or more lockout devices 110, 120 assembled to or integral with one or more components 10, 20 of a system to be locked out (e.g., an electrical or fluid control system). To secure each piece of equipment in a locked out condition, one or more locks 130 are locked in engagement with each of the lockout devices 110, 120 (for example, through lock apertures 111, 121). The secured lockout devices 110, 120 prevent access to or control of the components 10, 20, for example, by blocking access to a port, conduit, or other connection, or by blocking access to or movement of a switch, dial, button, control handle, or other such instrument. Examples of lockout devices that are secured in a lockout condition by a padlock locked through a lock aperture are described in U.S. Pat. Nos. 7,497,705; 7,501,593; 7,581,420; and 7,752,876, the entire disclosures of which are fully incorporated by reference herein, to the extent that they are not inconsistent with the present application. Additional locks 130 may be used with each lockout device 110, 120, for example, to require an additional or backup verifications that a system component 10, 20 may be safely returned to service.

Figure 2:
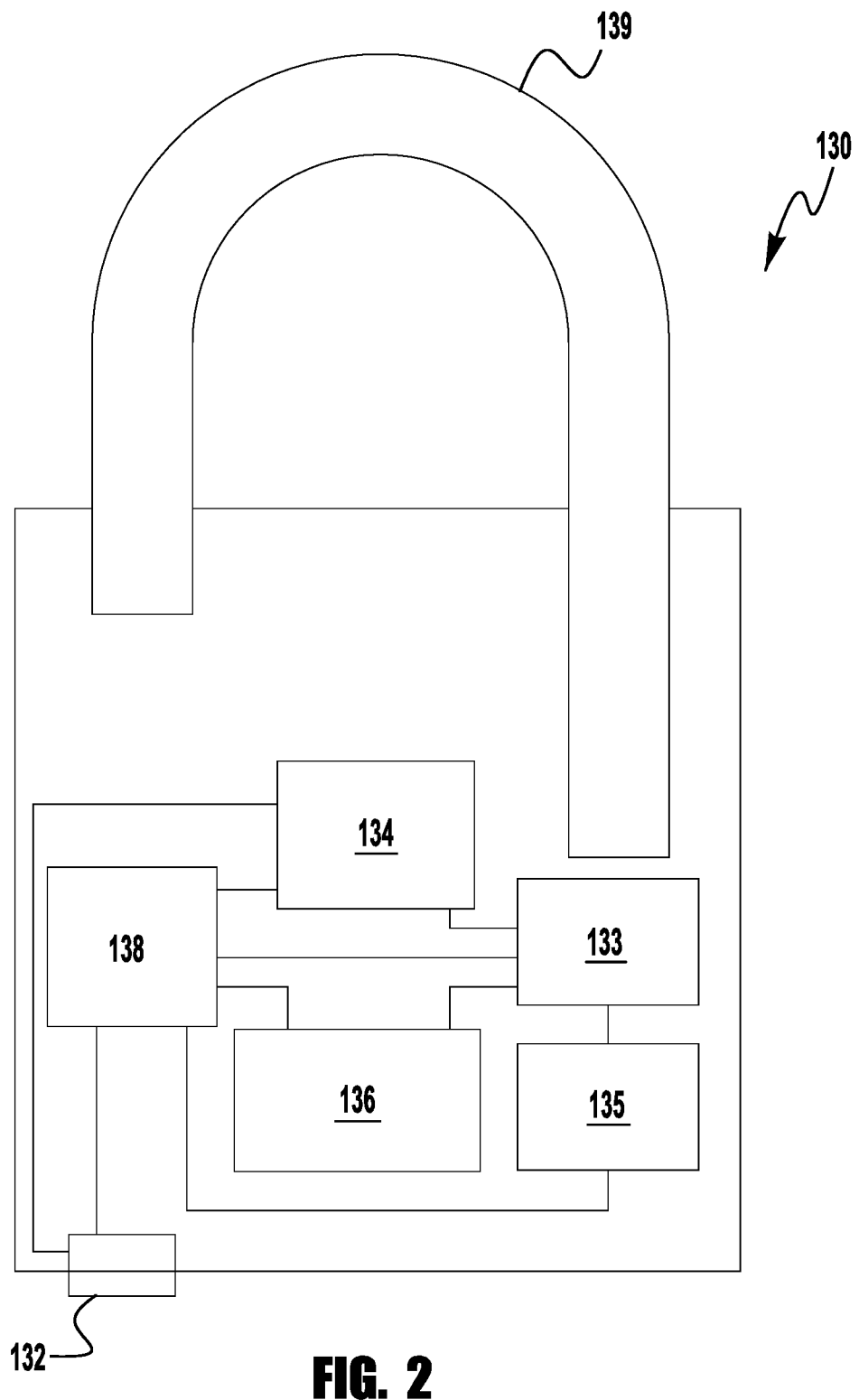
FIG. 2 is a schematic representation of a lock having a communication module to indicate a condition in the lock, according to an exemplary embodiment.

To provide an electronic record or audit trail of the system lockout procedure, as shown in FIG. 2, a lock 130 may be provided with a sensor 133 configured to identify when the lock 130 has been placed in a locked or unlocked condition. In one embodiment, the sensor 133 is an electronic component in electrical communication with an electromechanical locking mechanism of a lock, such that an electrical signal that initiates a change in the condition of the lock is also received by the sensor 133 to identify a locked or unlocked condition of the lock 130. Any suitable electromechanical locking arrangement may be utilized, including, for example, motor-driven, solenoid-driven, or shape memory alloy-driven locking mechanisms. Further, any suitable electronic interface may be utilized to actuate the electromechanical lock, including, for example, a wireless or remote control transceiver, an electromechanical key or key card reader, a keypad, or a biometric sensor. In another embodiment, the sensor is an electromechanical component (e.g., a sensor switch) that is mechanically actuated when the lock is changed between locked and unlocked conditions. For example, a sensor switch 133 may be positioned within a padlock 130 proximate to a surface of the shackle 139 (e.g., an end of the long leg of the shackle), such that movement of the shackle to a locked position actuates the sensor switch. As such, a lock with a mechanical or non-electrically operated locking mechanism may be configured to provide an electronic data signal identifying the condition of the lock.

The sensor 133 may transmit information regarding the condition of the lock 130 to a processor 134 within the lock 130 to store information regarding the condition of the lock 130. The lock 130 may additionally include a clock unit 135 to identify the date, time, and/or duration of a locked condition. In other embodiments, a clock 145, 155 is additionally or alternatively provided in the central computer 140 or reader 150 to identify the time of the transmission of information from the lock. Other sensors (not shown) may be utilized to identify other conditions, such as, for example, a low battery condition or attempts to tamper with the lock 130. These sensors 133 may also activate indicators (e.g., LED indicators, sirens) on the lock to provide an indication at the lock 130 of a change in the condition of the lock.

The sensor 133 and/or processor 134 may deliver a data signal to a communication module 136 within the lock 130, to deliver information about the condition of the lock 130 to an external device. Many different types of communication modules 136 may be utilized in the locks 130. For example, the communication module 136 may be configured to provide wireless communication utilizing one or more of WiFi (802.11), ZigBee (802.15), radio frequency (RF) communication, infrared (IR) transmission, near field communication (NFC), Bluetooth, or any other suitable wireless data protocol. Additionally or alternatively, the communication module 136 may be configured to provide wired communication, for example, through an Ethernet connection, USB cable, or other suitable connection. In one embodiment, the communication module 136 communicates directly with a centralized computer 140 or other such device, which may collect information directly from multiple locks 130 to evaluate the system lockout process. In another embodiment, the communication module 136 communicates with a reader or receiver 150, which collects information provided by one or more locks 130 for continuous, periodic, or selective communication with the central computer 140, using a second communication module 156. The second communication module 156 may be configured for any suitable wireless or wired communication (as listed above) with the central computer 140. The second communication module 156 may be configured for automatic, continuous, or periodic communication with the central computer 140. Additionally or alternatively, the second communication module 156 may be configured for selective communication with the central computer 140, for example, as initiated by a user operable switch or button, or by transporting the reader 150 to the central computer for a direct wired connection of the reader 150 to the computer 140.

The reader 150 may be provided at many different locations with respect to the lockout devices 110, 120 and system components 10, 20. In one example, the reader 150 is secured to or stationed proximate to either the lockout device 110, 120 or the system component 10, 20. By maintaining the reader 150 at the lockout device or system component, with a range that does not extend beyond that system component, the location of the locks 130 secured to that lockout device 110, 120 can be identified, as locks 130 secured to other locations in the system would not be readable by the reader 150. In another example, the reader 150 may be a portable unit (e.g., a cell phone/smart phone, or a dedicated RFID reading device) that may be brought into proximity with a lockout device 110, 120 to obtain information communicated by the communication module 136. In such an embodiment, the lockout device 110, 120 or system component 10, 20, may also be provided with an RFID tag including information about the location of the system component, or the type of system component with which the lockout device is used. In such an arrangement, the portable reader may simultaneously or sequentially read the RFID tags of the lockout device/system component and the locks 130, such that the lock identifying serial code is associated with the location or use identifying code of the lockout device or system component. In still another example, the reader 150 may be a centralized device configured to receive information from the communication modules 136 of locks 130 secured to multiple lockout devices 110, 120. The permissible distance between the reader 150 and the communication module 136 may depend in part on the type of wired or wireless communication utilized to transmit electronic data signals from the communication module 136 to the reader 150, and/or the power source available to power the communication. Using a central reader 150, the location of the locks 130 utilized within the system may be identified by some other method, such as, for example, dedicating certain locks 130 to certain system components 10, 20 (e.g., by labeling, color coding, or configuring the lock so that the lock will only be usable with one of the system components). By using dedicated locks 130, the RFID serial code data may be used to identify the location or use of the lock.

In an exemplary embodiment of the present application, a lock for a safety lockout system is provided with a radio frequency identification (RFID) tag that communicates information about the identity and/or condition of the lock to an RFID reader or interrogator. In one example, a lock 130 includes a passive (unpowered) RFID tag 136 that is continuously, periodically, or selectively interrogated by a nearby RFID reader 150. To eliminate the need for a power supply to the lock, other electronic components, such as the sensor 133, processor 134, and clock unit 135 may be eliminated. In such an embodiment, the RFID reader 150 may be secured at a location close enough to the lock 130 to ensure that the passive RFID tag 136 is properly read. For example, the RFID reader 150 may be assembled with or provided in either the lockout device or the system component to be locked out to ensure sufficient proximity to the RFID tags 136 of any locks 130 secured to the lockout device 110. In other embodiments, the RFID reader may be built into or provided with a lockout or tag out station, in a portable unit that may be carried to the system to be locked out (e.g., a cell phone/smart phone, or dedicated RFID interrogating device), in a safety lockout sign or placard, in a tool box, or in a carrying case for the locks 130.

To provide an indication of the condition of the lock 130, the lock may include an RFID tag configured to be detectable only when the lock is in a predetermined condition (e.g., a locked or unlocked condition). In one such embodiment, a lock may include a "locked condition" RFID tag having an RFID chip, coded to identify the lock and its locked condition, connected to an RFID tag antenna by a sensor switch that is activated when the lock is in a locked condition (and disconnected from the RFID antenna when the lock is in an unlocked condition). In another embodiment, a lock may additionally or alternatively include an "unlocked condition" RFID tag having an RFID chip, coded to identify the lock and its unlocked condition, that is connected to an RFID antenna by a sensor switch that is activated when the lock is in an unlocked condition (and disconnected from the RFID antenna when the lock is in a locked condition). Where both a locked condition RFID tag and an unlocked condition RFID tag are utilized in a lock, the RFID reader can obtain a positive indication of the presence of a locked lock proximate to the RFID reader, distinguishable from the presence of an unlocked lock proximate to the RFID reader or the absence of the lock from the proximity of the RFID reader.

Figure 3:
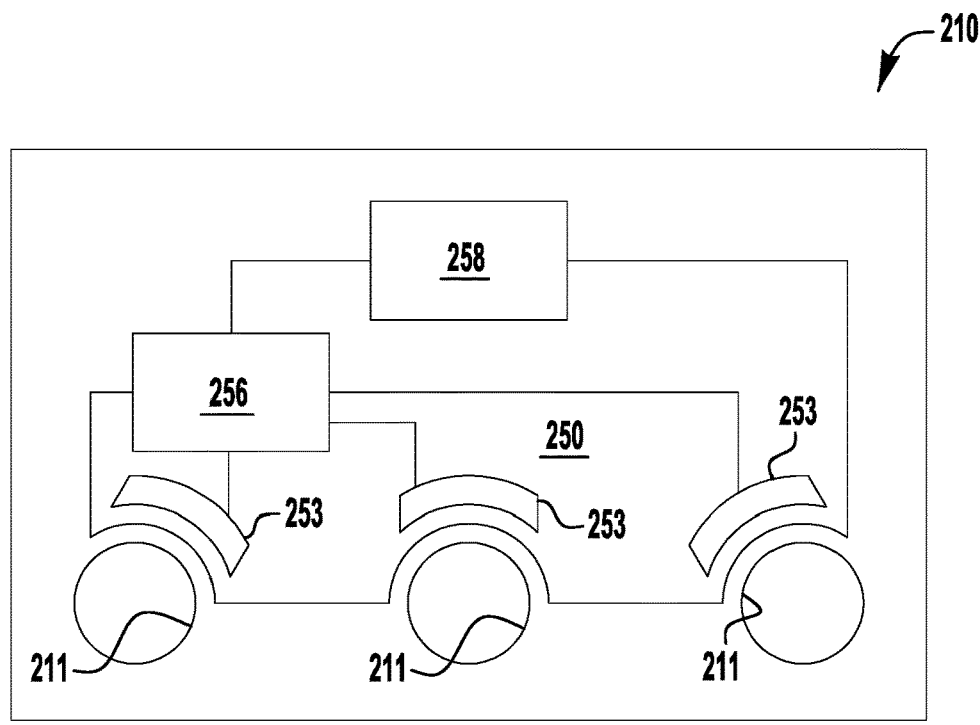
FIG. 3 is a schematic representation of a lockout device having a reader to receive a data signal from a lock with a communication module, according to an exemplary embodiment.

To preserve power (e.g., from an internal battery or an external source), the RFID reader 150 may be configured such that the reader is only powered when a lock 130 has been applied to the lockout device. For example, as shown in FIG. 3, lock apertures 211 in a lockout device 210, powered by a rechargeable internal battery 258 (or any other suitable power source) may be provided with one or more sensor switches 253 that are actuated when a lock shackle is inserted through one of the apertures to initiate powered operation of a reader 250 assembled with or integral to the lockout device 210. These same sensor switches 253 may be connected with a communication module 256 within the reader 250 to initiate communication of information regarding the condition of the lockout device 210 to a central computer. In such an arrangement, an indication of a lock assembled with the lockout device 210 that is not accompanied by an indication of the presence of a lock in a locked condition may trigger an alert that an unauthorized lock or a defective lock has been used with the lockout device 210. Likewise, an indication of the presence of a lock in a locked condition that is not accompanied by an indication of a lock assembled with the lockout device may trigger an alert that the device was not properly locked out or that the lockout device is defective.

In another embodiment, a lock 130 may utilize an active (powered) RFID tag 136 that continuously, periodically, or selectively delivers an RFID signal to an RFID reader 150. Using an active RFID tag 136, the lock 130 may deliver information about the identity and/or condition of the lock to a reader 150 disposed at a greater distance from the lock 130 and lockout device 110. For example, an active RFID tag 136 may deliver information to a reader 150 that is centrally located to multiple components of a system being locked out to read active RFID tags 136 associated with locks 130 secured to multiple lockout devices 110, 120 on multiple system components 10, 20. To preserve power (e.g., from an internal battery or an external source), the lock 130 may be configured such that the RFID tag 136 is only powered when the lock 130 experiences a change in condition (e.g., a change from an unlocked condition to a locked condition, a change from a locked condition to an unlocked condition, a low battery condition, or a sensed attempt to tamper with the lock), as may be identified, for example, by a lock sensor switch 133. To power the RFID tag 136, processor 134, clock unit 135, and/or sensor switch 133, the lock 130 may be provided with an internal battery 138 selected to provide sufficient power to operate the electrical components of the lock 130. In one embodiment, the battery 138 may be rechargeable, with the lock 130 including an external connection or contact 132 for charging the battery 138 when the lock 130 is not in use. Further, the external connection 132 may additionally provide data connectivity (e.g., a serial port or USB port) to download lock usage information from the lock 130 to a central computer, docking station, or other such device. Other power sources may additionally or alternatively be utilized to power to lock 130, including, for example, solar cells, piezoelectric cells (e.g., generating power when the shackle is pushed closed), or the harvesting of electromagnetic waves received by the RFID antenna in the lock.

As with the passive RFID tags, to provide an indication of the condition of the lock 130, the lock may include an RFID tag configured to be detectable only when the lock is in a predetermined condition (e.g., a locked or unlocked condition). In one such embodiment, a lock may include a "locked condition" RFID tag having an RFID chip, coded to identify the lock and its locked condition, connected to an RFID tag antenna and/or an internal battery by a sensor switch that is activated when the lock is in a locked condition (and disconnected from the RFID antenna and/or the internal battery when the lock is in an unlocked condition). In another embodiment, a lock may additionally or alternatively include an "unlocked condition" RFID tag having an RFID chip, coded to identify the lock and its unlocked condition, that is connected to an RFID tag antenna and/or an internal battery by a sensor switch that is activated when the lock is in an unlocked condition (and disconnected from the RFID antenna and/or the internal battery when the lock is in a locked condition). Where both a locked condition RFID tag and an unlocked condition RFID tag are utilized in a lock, the RFID reader can obtain a positive indication of the presence of a locked lock proximate to the RFID reader, distinguishable from the presence of an unlocked lock proximate to the RFID reader or the absence of the lock from the proximity of the RFID reader.

While the locks 130 may be constructed of any suitable material, in one embodiment, a lock 130 is provided with a plastic body selected to minimize interference with the transmitted RF signals.

Figure 4:
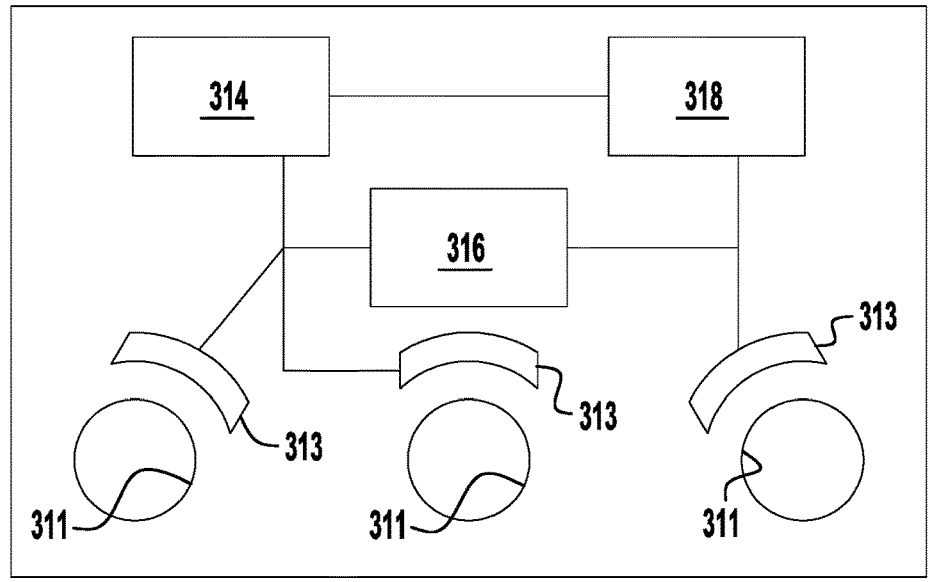
FIG. 4 is a schematic representation of a lockout device having a communication module to indicate a condition in the lockout device, according to an exemplary embodiment.

Additionally or alternatively, as shown in FIG. 4, a lockout device 310 may be provided with an active or passive RFID tag 316 configured to continuously, periodically, or selectively deliver a data signal to an RFID reader. The RFID tag 316 may provide information about the condition of the lockout device 310 (e.g., locked or unlocked condition, locks secured to multiple lock apertures, attempts to tamper with the lockout device, or a low battery condition), along with identification of the system component 10 with which the lockout device 310 is assembled, and the time at which the condition is identified. In one example, lock apertures 311 in the lockout device 310 are provided with sensor switches 313 that are actuated when a lock shackle is inserted through one of the apertures to activate the RFID tag 316 identifying a locked condition (e.g., by connecting the RFID tag antenna and/or internal battery with the RFID tag chip). Additionally or alternatively, a data signal may be provided to a processor 314 within the lockout device 310, to store the lockout event information for future auditing. The electrical components of the lockout device 310 may be powered by an internal battery 318 (e.g., a rechargeable battery), or by any other suitable power source.

Once the reader 150, 250 has obtained information related to conditions or usage of the locks 130 and/or the lockout devices 110, 120, 210, a communication module 156, 256 within the reader 150, 250 delivers the information to the central computer 140 (for example, using any of the wired or wireless data communication protocols identified above). In other embodiments, the sensor switches 133, 253, 313 in the locks 130 and/or the lockout devices 210, 310 may transmit data signals directly to a central computer 140 (for example, using any of the wired or wireless data communication protocols identified above), eliminating the need for an RFID tag and reader to communicate the sensed condition. Depending on the frequency of the delivery of information to the central computer 140, the central computer may be configured to track the status of a locked out system in real time, at periodic intervals, or when prompted (for example, as part of an audit).

The central computer 140 may be provided with software configured to maintain a database of safety lockout conditions and procedures. For example, using serial codes assigned to each lock and/or lockout device, the database may identify the individuals or groups to whom locks and lockout devices have been issued. These same serial codes may be identified in each data transmission originating from the corresponding lock and/or lockout device, such that each step in the lockout process may be associated with a known individual or group. By identifying safety lockout procedure events in the order that they occur, the database can identify the order in which multiple system components have been locked out or brought back into service, or the order in which individuals have locked out a system component or withdrawn the lockout (e.g., to identify the individual that initiated the lockout or terminated the lockout). Any deviations from standard safety lockout procedure may be recorded for immediate alert or identification in a subsequent audit (e.g., as communicated directly from the central computer, or to an administrator's computer or smart phone).

Example I—Locks with Passive RFID Tags

In an exemplary lockout procedure using locks 130 having passive RFID tags 136, an individual locks a first lock 130 to a first lockout device 110 assembled with a first system component 10, by inserting a shackle 139 of the lock 130 through a lock aperture 111 in the lockout device 110 and moving the shackle to the locked condition. The inserted shackle 139 actuates a sensor switch 253 in the lockout device 210 to connect the RFID antenna with the RFID chip in a passive "locked condition" RFID tag 136 to identify the locked condition. An RFID reader 150 proximate to the system component 10 (e.g., affixed to the component 10 or integral with the lockout device 110) interrogates the passive RFID tag 136 to identify the condition and identification code of the lock 130 (stored in the RFID tag 136) and the locked condition of the lock 130. Depending in part on acceptable power usage, this interrogation may be performed continuously, periodically (e.g., every 5 seconds), or in response to a triggering condition, such as movement detected by a motion or vibration sensor, or a sensor switch actuated by assembly of the lock 130 with the lockout device 110. The RFID reader 150 communicates the lock identification code, condition code, a component identification code (corresponding to the system component or a lockout device dedicated to that system component), and a time code (corresponding the time at which the RFID tag 236 was interrogated, as obtained from a clock unit 155 in the RFID reader 150) to a central computer 140. The central computer 140 stores this information in a database, which associates the serial code with the individual or group to which the serial code has been assigned. Where lockout of a device by multiple individuals or groups is desired, this process is repeated for each additional lock 130 that is locked onto the lockout device 110. The individual (or another individual) may then lock one or more locks 130 to a second lockout device 120 assembled with a second system component 20 of the system to be locked out, for communication with a second RFID reader 150 proximate to the second lockout device 120, using the process described above.

When a lock 130 is unlocked and removed from one of the lockout devices 110, 120, the corresponding reader 150 interrogates an "unlocked condition" RFID tag 136 of the lock 130 (activated by a sensor switch connecting the RFID antenna with the RFID chip when the lock is removed from the lockout device) to identify the unlocked condition (or alternatively, recognizes the absence of a data signal from the opened or removed lock 130). The RFID reader 150 then communicates the lock identification code, condition code, component serial code, and time code to the central computer 140.

As the condition code, identification code, component code, and time code are identified for each lockout event, the database may be used to track and determine the individuals and system components involved in the lockout process, the order in which the individuals participated, and the order in which the components were locked out or brought back into service. The central computer 140 may be configured to issue an alert if any of these lockout events deviates from a standard accepted practice. Other condition codes associated with a condition of the lock 130, for example, a lower battery condition, or sensed tampering with the lock 130, may likewise be communicated to the central computer 140 for recording in the database and/or issuance of an appropriate alert.

Example II—Locks with Active RFID Tags

In an exemplary lockout procedure using locks 130 having active RFID tags 136, an individual locks a first lock 130 to a first lockout device 110 assembled with a first system component 10, by inserting a shackle of the lock 130 through a lock aperture 111 in the lockout device 110 and moving the shackle to the locked condition. The locked shackle 139 actuates a sensor switch 133 in the lock 130 to connect an RFID antenna or internal battery with an RFID chip of a "locked condition" active RFID tag 136 to identify the locked condition. Activation of the sensor switch 133 also prompts the RFID tag to transmit a data signal to an RFID reader 150 spaced apart from the system component 10. The data signal identifies the identification code and condition code (corresponding to a locked condition) of the lock 130. The RFID reader 150 communicates the lock identification code, condition code, a component identification code (corresponding to the system component or a lockout device dedicated to that system component), and a time code (corresponding the time at which the RFID reader 150 received the data signal, as obtained from a clock unit 155 in the RFID reader 150) to a central computer 140. The central computer 140 stores this information in a database, which associates the identification code with the individual or group to which the corresponding lock has been assigned. Where lockout of a device by multiple individuals or groups is desired, this process is repeated for each additional lock 130 that is locked onto the lockout device 110. The individual (or another individual) may then lock one or more locks 130 to a second lockout device 120 assembled with a second system component 20 of the system to be locked out, using the process described above. The active RFID tag 136 in the second lock 130 may transmit a data signal to a second RFID reader 150 proximate to the second system component 20. Additionally or alternatively, the active RFID tag 136 may transmit a data signal to the same RFID reader 150, which may be centrally located to receive data signals from locks 130 secured to multiple lockout devices 110, 120.

When a lock 130 is unlocked for removal from the lockout device 110, deactivation of the sensor switch 133 disconnects the RFID antenna from the RFID chip of the locked condition RFID tag 136 to identify the unlocked condition, based on the absence of the data signal from the locked condition RFID tag. Additionally or alternatively, unlocking the lock 130 may result in activation of a sensor switch to connect an RFID antenna and/or internal battery to an RFID chip of an unlocked condition RFID tag, such that the unlocked condition RFID tag communicates the lock identification code, condition code, component code, and time code to the RFID reader, for communication to the central computer 140.

As discussed above, the central computer database may be used to track and determine the individuals and system components involved in the lockout process, the order in which the individuals participated, and the order in which the components were locked out or brought back into service. The central computer 140 may be configured to issue an alert if any of these lockout events deviates from a standard accepted practice. Other condition codes associated with a condition of the lock 130, for example, a low battery condition, or sensed tampering with the lock 130, may likewise be communicated to the central computer 140 for recording in the database and/or issuance of an appropriate alert.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

What is claimed is:

1. A method of monitoring lockout procedures for a multi-process arrangement having first and second components, the method comprising:
   securing a first lockout device with the first component in a lockout condition to block operation of the first component;
   receiving a first data signal corresponding to the first lockout device being secured with the first component in the lockout condition, the first data signal including at least a first identification code corresponding to the first lockout device;
   securing a second lockout device with the second component in a lockout condition to block operation of the second component;
   receiving a second data signal corresponding to the second lockout device being secured with the second component in the lockout condition, the second data signal including at least a second identification code corresponding to the second lockout device;
   monitoring the first and second data signals to determine an order in which the first and second lockout devices have been locked out; and
   comparing the order in which the first and second lockout devices have been locked out with a predefined lockout procedure, and providing an alert if the order is inconsistent with the predefined lockout procedure.

2. The method of claim 1, further comprising delivering information corresponding to the first and second data signals to a central computer.

3. The method of claim 1, wherein the first and second data signals further include a condition code identifying a lockout condition of the first and second lockout devices.

4. The method of claim 1, wherein the first and second data signals are generated by the first and second lockout devices.

5. The method of claim 1, wherein securing the first and second lockout devices in the lockout conditions comprises securing first and second lock units to first and second lockout interfaces of the first and second lockout devices.

6. The method of claim 5, wherein the first and second data signals are generated by the first and second lock units.

7. The method of claim 5, further comprising receiving a third data signal corresponding to the first lockout device being secured with the first component in the lockout condition, the third data signal including at least a third identification code corresponding to the first lock unit, and receiving a fourth data signal corresponding to the second lockout device being secured with the second component in the lockout condition, the fourth data signal including at least a fourth identification code corresponding to the second lock unit.

8. The method of claim 5, wherein the first lock unit comprises a first padlock and the second lock unit comprises a second padlock.

9. The method of claim 5, wherein the third and fourth data signals are generated when the first and second lock units are placed in a locked condition.

10. The method of claim 5, wherein the first and second data signals are generated when the first and second lock units are secured to the first and second lockout interfaces.

11. The method of claim 5, further comprising identifying system users that locked out the first and second components based on the third and fourth identification codes.

12. The method of claim 1, wherein the first and second data signals are generated when the first and second lockout devices are moved to the lockout condition.

13. The method of claim 1, wherein the first and second data signals are generated by first and second RFID tags.

14. The method of claim 1, wherein the first and second data signals are received at a receiver proximate to the first and second components.

15. The method of claim 14, wherein the receiver comprises one of a smart phone and an RFID reading device.

16. The method of claim 1, wherein the first data signal is received at a first receiver proximate to the first component, and the second data signal is received at a second receiver proximate to the second component.

* * * * *